United States Patent
Du et al.

(10) Patent No.: US 11,177,468 B2
(45) Date of Patent: Nov. 16, 2021

(54) HIGH-COMPACTED-DENSITY POSITIVE ELECTRODE MATERIAL AND ELECTROCHEMICAL ENERGY STORAGE APPARATUS

(71) Applicant: CONTEMPORARY AMPEREX TECHNOLOGY CO., LIMITED, Ningde (CN)

(72) Inventors: Rui Du, Ningde (CN); Yongchao Liu, Ningde (CN); Deyu Zhao, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/135,552

(22) Filed: Dec. 28, 2020

(65) Prior Publication Data

US 2021/0126242 A1  Apr. 29, 2021

Related U.S. Application Data

(63) Continuation of application No. PCT/CN2019/120591, filed on Nov. 25, 2019.

(30) Foreign Application Priority Data

Dec. 29, 2018  (CN) .......................... 201811637494.9

(51) Int. Cl.
   *H01M 4/131*  (2010.01)
   *H01M 4/134*  (2010.01)
   (Continued)

(52) U.S. Cl.
   CPC ............ *H01M 4/131* (2013.01); *C01G 53/50* (2013.01); *H01M 4/134* (2013.01); *H01M 4/505* (2013.01);
   (Continued)

(58) Field of Classification Search
   CPC ....... H01M 10/0525; H01M 2004/021; H01M 2004/028; H01M 4/131; H01M 4/134;
   (Continued)

(56) References Cited

FOREIGN PATENT DOCUMENTS

| CN | 106159244 A | 11/2016 |
|---|---|---|
| CN | 107068952 A | 8/2017 |

(Continued)

OTHER PUBLICATIONS

Contemporary Amperex Technology Co., Limited, International Search Report and Written Opinion, PCT/CN2019/120591, dated Feb. 28, 2020, 12 pgs.

*Primary Examiner* — Carlos Barcena
(74) *Attorney, Agent, or Firm* — Morgan, Lewis & Bockius LLP

(57) ABSTRACT

This application relates to the field of battery technologies, and in particular, to a high-compacted-density positive electrode material and an electrochemical energy storage apparatus. The positive electrode material includes a lithium-nickel transition metal oxide A and a lithium-nickel transition metal oxide B. The lithium-nickel transition metal oxide A is secondary particles, whose chemical formula is shown in formula I: $Li_{a1}(Ni_{b1}Co_{c1}Mn_{d1})_{x1}M_{1-x1}O_{2-e1}X_{e1}$. The lithium-nickel transition metal oxide B is a monocrystalline structure or a monocrystalline-like structure, whose chemical formula is shown in formula II: $Li_{a2}(Ni_{b2}Co_{c2}Mn_{d2})_{x2}M'_{1-x2}O_{2-e2}X'_{e2}$ (II). The positive electrode material of this application includes the large-particle lithium-nickel transition metal oxide A and the small-particle lithium-nickel transition metal oxide B to improve an energy density of the battery. A degree of crystallinity and particle size distribution of the mixed positive electrode (Continued)

material can improve a compacted density of the high-nickel active material, and ensure lower gassing and good cycle performance.

17 Claims, 1 Drawing Sheet

(51) Int. Cl.
    *H01M 4/505*     (2010.01)
    *H01M 4/525*     (2010.01)
    *H01M 10/0525*     (2010.01)
    *C01G 53/00*     (2006.01)
    *H01M 4/02*     (2006.01)

(52) U.S. Cl.
    CPC ....... *H01M 4/525* (2013.01); *H01M 10/0525* (2013.01); *C01P 2002/74* (2013.01); *H01M 2004/021* (2013.01); *H01M 2004/028* (2013.01)

(58) Field of Classification Search
    CPC ........ H01M 4/36; H01M 4/485; H01M 4/505; H01M 4/525
    See application file for complete search history.

(56) References Cited

FOREIGN PATENT DOCUMENTS

| | | |
|---|---|---|
| CN | 107359334 A | 11/2017 |
| CN | 107534143 A | 1/2018 |
| JP | 2018095546 A | 6/2018 |
| WO | WO2018043671 A1 | 3/2018 |

HIGH-COMPACTED-DENSITY POSITIVE ELECTRODE MATERIAL AND ELECTROCHEMICAL ENERGY STORAGE APPARATUS

CROSS-REFERENCE TO RELATED APPLICATIONS

This application is a continuation application of PCT Patent Application No. PCT/CN2019/120591, entitled "POSITIVE ELECTRODE MATERIAL WITH HIGH COMPACTED DENSITY AND ELECTROCHEMICAL ENERGY STORAGE DEVICE" filed on Nov. 25, 2019, which claims priority to Chinese Patent Application No. 201811637494.9, filed with the State Intellectual Property Office of the People's Republic of China on Dec. 29, 2018, and entitled "HIGH-COMPACTED-DENSITY POSITIVE ACTIVE MATERIAL AND ELECTROCHEMICAL ENERGY STORAGE APPARATUS", all of which are incorporated herein by reference in their entirety.

TECHNICAL FIELD

This application relates to the field of battery technologies, and in particular, to a high-compacted-density positive electrode material and an electrochemical energy storage apparatus.

BACKGROUND

In order to provide a high energy density, a positive electrode material is usually optimized from two aspects: one is to increase nickel content in the positive electrode material to improve its reversible capacity; the other is to increase its powder compacted density by combining large particles and small particles. At present, a high-nickel ternary material provides a high reversible capacity, but has a low powder compacted density.

At present, there are two common schemes for high powder compacted density. One scheme is mixing polycrystalline large particles with polycrystalline small particles. This method is usually used for low-nickel ternary materials with relatively low gram capacity, leading to low energy density of the positive electrode material. In rare scenarios, high-nickel polycrystalline large particles are mixed with high-nickel polycrystalline small particles. This design provides high energy density. However, the high-nickel polycrystalline small particles are prone to crush during cold pressing, resulting in severe gassing. The other scheme is using a high-nickel polycrystalline material with relatively wide particle distribution. However, excessively wide particle distribution also easily causes crushing during cold pressing and cycling, resulting in the same gassing problem.

SUMMARY

In view of the foregoing prior-art defects, an objective of this application is to provide a high-compacted-density positive electrode material and an electrochemical energy storage apparatus using the positive electrode material. The positive electrode material of this application can mitigate the gassing performance problem caused by particle crushing during cold pressing.

To implement the foregoing and other related purposes, one aspect of this application provides a positive electrode material, where the positive electrode material includes a lithium-nickel transition metal oxide A and a lithium-nickel transition metal oxide B, the lithium-nickel transition metal oxide A is secondary particles, and a chemical formula of the lithium-nickel transition metal oxide A is shown in Formula I:

$$Li_{a1}(Ni_{b1}Co_{c1}Mn_{d1})_{x1}M_{1-x1}O_{2-e1}X_{e1} \quad (I)$$

in Formula I, $0.95 \le a1 \le 1.05$, $0.7 \le b1 \le 0.98$, $0.01 \le c1 \le 0.15$, $0.01 \le d1 \le 0.3$, $0.95 \le x1 \le 1$, and $0 \le e1 \le 0.1$, where M is selected from any one or a combination of Al, Ti, Zr, Nb, Sr, Sc, Sb, Y, Ba, B, C, Co, and Mn, and X is selected from F and/or Cl;

the lithium-nickel transition metal oxide B is monocrystalline or monocrystalline-like particles, and a chemical formula of the lithium-nickel transition metal oxide B is shown in Formula II:

$$Li_{a2}(Ni_{b2}Co_{c2}Mn_{d2})_{x2}M'_{1-x2}O_{2-e2}X'_{e2} \quad (II)$$

In Formula II, $0.95 \le a2 \le 1.05$, $0.7 \le b2 \le 0.98$, $0.01 \le c2 \le 0.15$, $0.01 \le d2 \le 0.3$, $0.95 \le x2 \le 1$, and $0 \le e2 \le 0.1$, where M' is selected from any one or a combination of Al, Ti, Zr, Nb, Sr, Sc, Sb, Y, Ba, B, C, Co, and Mn, and X' is selected from F and/or Cl; and a crystal size $D_{104}$ of the positive electrode material and a particle size distribution change rate $\Delta PSD$ of the positive electrode material satisfy: $50 \text{ nm} \le D_{104} \times \Delta PSD \le 450 \text{ nm}$, where $\Delta PSD$ is a particle size distribution change rate calculated according to the formula $\Delta PSD = (D_v 90 - D_v 10)/D_v 50$ through volume particle distribution measurement on the positive electrode material, and $D_{104}$ is a crystal size obtained by fitting a peak value of a 104 crystal plane through XRD ray diffraction testing on the positive electrode material.

Another aspect of this application provides an electrochemical energy storage apparatus, including the positive electrode material of this application.

Compared with the prior art, this application has the following beneficial effects:

The positive electrode material in this application includes a large-particle lithium-nickel transition metal oxide A (large-particle high-nickel ternary polycrystalline positive electrode material) and a small-particle lithium-nickel transition metal oxide B (small-particle high-nickel ternary monocrystalline or monocrystalline-like positive electrode material). Because nickel contents of the positive electrode material A and the positive electrode material B are relatively high, the energy density of the battery can be increased. In addition, a degree of crystallinity and particle size distribution of the mixed positive electrode material can be controlled to effectively mitigate the particle crushing problem of the high-nickel active material during cold pressing and cycling, improve the powder compacted density of the high-nickel active material, and ensure lower gassing and good cycle performance.

DESCRIPTION OF EMBODIMENTS

Figure 1:
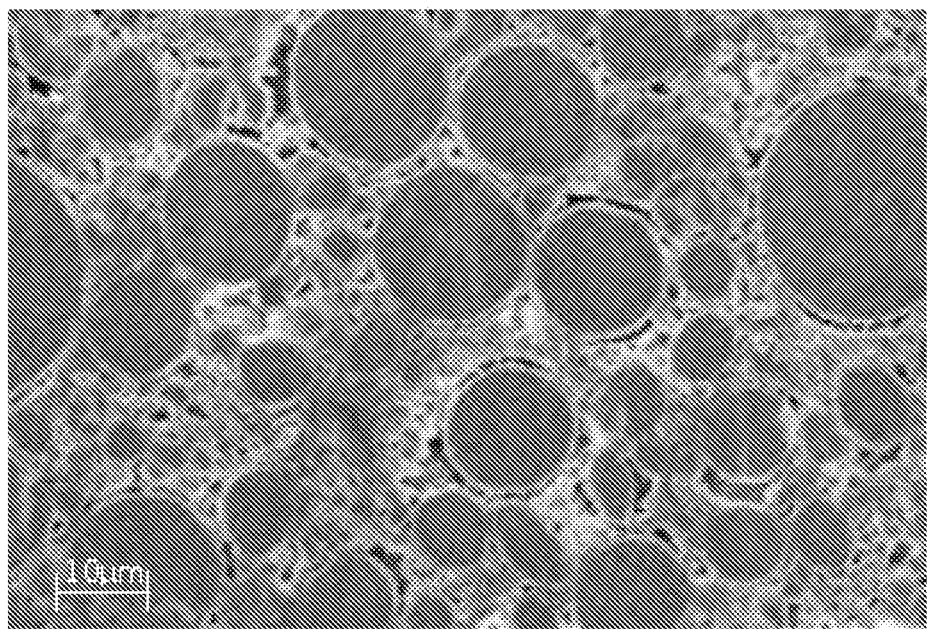
FIG. 1 is a scanning electron microscope graph of a positive electrode material prepared according to Example 1 of this application.

The following describes in detail a high-compacted-density positive electrode material and the electrochemical energy storage apparatus using the positive electrode material according to this application.

A first aspect of this application provides a positive electrode material, where the positive electrode material includes a lithium-nickel transition metal oxide A and a lithium-nickel transition metal oxide B, the lithium-nickel transition metal oxide A is secondary particles, and a chemical formula of the lithium-nickel transition metal oxide A is shown in Formula I:

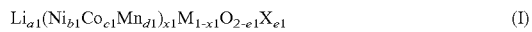

$$Li_{a1}(Ni_{b1}Co_{c1}Mn_{d1})_{x1}M_{1-x1}O_{2-e1}X_{e1} \quad (I)$$

In Formula I, $0.95 \leq a1 \leq 1.05$, $0.7 \leq b1 \leq 0.98$, $0.01 \leq c1 \leq 0.15$, $0.01 \leq d1 \leq 0.3$, $0.95 \leq x1 \leq 1$, and $0 \leq e1 \leq 0.1$, where M is selected from any one or a combination of Al, Ti, Zr, Nb, Sr, Sc, Sb, Y, Ba, B, C, Co, and Mn, and X is selected from F and/or Cl;

the lithium-nickel transition metal oxide B is monocrystalline or monocrystalline-like particles, and a chemical formula of the lithium-nickel transition metal oxide B is shown in Formula II:

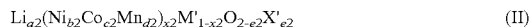

$$Li_{a2}(Ni_{b2}Co_{c2}Mn_{d2})_{x2}M'_{1-x2}O_{2-e2}X'_{e2} \quad (II)$$

In Formula II, $0.95 \leq a2 \leq 1.05$, $0.7 \leq b2 \leq 0.98$, $0.01 \leq c2 \leq 0.15$, $0.01 \leq d2 \leq 0.3$, $0.95 \leq x2 \leq 1$, and $0 \leq e2 \leq 0.1$, where M' is selected from any one or a combination of Al, Ti, Zr, Nb, Sr, Sc, Sb, Y, Ba, B, C, Co, and Mn, and X' is selected from F and/or Cl; and a crystal size $D_{104}$ of the positive electrode material and a particle size distribution change rate $\Delta PSD$ of the positive electrode material satisfy: 50 nm $\leq D_{104} \times \Delta PSD \leq 450$ nm, where $\Delta PSD$ is a particle size distribution change rate calculated according to the formula $\Delta PSD = (D_v 90 - D_v 10)/D_v 50$ through volume particle distribution measurement on the positive electrode material, $D_{104}$ is a crystal size obtained by fitting a peak value of a 104 crystal plane through XRD ray diffraction testing on the positive electrode material, and $D_{104}$ is measured in nm.

The positive electrode material in this application uses a mixed material of a large-particle lithium-nickel transition metal oxide A (large-particle high-nickel ternary polycrystalline positive electrode material) and a small-particle lithium-nickel transition metal oxide B (small-particle high-nickel ternary monocrystalline positive electrode material). A degree of crystallinity and particle size distribution of the mixed high-nickel active material can be controlled to effectively mitigate the particle crushing problem during cold pressing and cycling, improve the compacted density of the high-nickel powder, and also ensure lower gassing and good cycle performance.

In the positive electrode material provided in this application, monocrystalline-like means that the primary particles are larger than 1 μm in size, but the primary particles are agglomerated. Monocrystalline means that the primary particles are larger than 1 μm in size, but are not agglomerated obviously.

In the positive electrode material provided in this application, a range of $D_{104} \times \Delta PSD$ is optionally 50 nm to 450 nm, 50 nm to 80 nm, 80 nm to 120 nm, 80 nm to 250 nm, 120 nm to 250 nm, 250 nm to 350 nm, or 350 nm to 450 nm.

In some embodiments, a range of $D_{104} \times \Delta PSD$ is 80 nm to 250 nm.

In the positive electrode material provided in this application, $\Delta PSD$ is 1.2 to 2.5, 1.5 to 2.2, 1.2 to 1.5, 1.5 to 2.1, 2.1 to 2.5, or 2.5 to 3.1. When $\Delta PSD$ is within the foregoing range, the particle size distribution of the positive electrode material is relatively concentrated. On the one hand, a relative content of small-size particles can be reduced to avoid the degraded gassing problem. In addition, a compacted density of an electrode plate is increased to satisfy energy requirements of the high capacity battery, and also a probability of particle crushing of the positive electrode material under high pressure is decreased and the particles are not prone to cracking during pressing.

In some embodiments, the range of $\Delta PSD$ is 1.5 to 2.2.

In the positive electrode material provided in this application, the positive electrode material has $D_v 50$ of 5 μm to 15 μm, 5 μm to 8 μm, 8 μm to 12 μm, or 12 μm to 15 μm; $Dv10$ of 1 μm to 5 μm, 1 μm to 3 μm, or 3 μm to 5 μm; and $D_v 90$ of 12 μm to 25 μm, 12 μm to 15 μm, 15 μm to 20 μm, or 20 μm to 25 μm. $D_v 10$ is a corresponding particle size obtained when a cumulative volume distribution percentage of a sample reaches 10%. $D_v 50$ is a corresponding particle size obtained when a cumulative volume distribution percentage of a sample reaches 50%. $D_v 90$ is a corresponding particle size obtained when a cumulative volume distribution percentage of a sample reaches 90%.

In some embodiments, the positive electrode material has $D_v 50$ of 8 μm to 12 μm, $D_v 10$ of 1 μm to 3 μm, and $D_v 90$ of 15 μm to 20 μm.

In the positive electrode material provided in this application, the $D_{104}$ is 40 nm to 200 nm, 40 nm to 50 nm, 50 nm to 100 nm, 100 nm to 150 nm, or 150 nm to 200 nm. In this application, $D_{104}$ is obtained through calculation by fitting a peak value of a crystal plane 104 through X-ray diffraction testing on a mixed system of the secondary-particle lithium-nickel transition metal oxide A and the monocrystalline/monocrystalline-like lithium-nickel transition metal oxide B, and indicates an average crystal size of crystals corresponding to the mixed system considered as a whole. When $D_{104}$ is within the foregoing range, the capacity of positive electrode material is better, and polarization of positive electrode material is smaller, with slight side reaction with an electrolyte.

In some embodiments, $D_{104}$ is 50 nm to 100 nm.

In the positive electrode material provided in this application, the compacted density of the positive electrode material is 3.3 g/cm$^3$ to 3.7 g/cm$^3$. Generally, if the compacted density is less than 3.3 g/cm$^3$, the compacted density is excessively small and the energy density is excessively low. However, if the compacted density is greater than 3.7 g/cm$^3$, the compacted density is excessively large, resulting in severe particle crushing and gassing.

In the positive electrode material provided in this application, a specific surface area of the positive electrode material is 0.5 m$^2$/g to 1.5 m$^2$/g, 0.5 m$^2$/g to 0.6 m$^2$/g, 0.6 m$^2$/g to 1.0 m$^2$/g, or 1 m$^2$/g to 1.5 m$^2$/g. In the positive active material described in this application, the real specific surface area of the positive active material is within the foregoing range, and a contact area between the electrolyte and the positive active material is relatively small, which helps inhibiting side reaction, and avoids damages to a crystal structure of the positive active material which accelerate the battery inflation problem. In addition, the specific surface area of the positive active material is within the foregoing range, so that fewer auxiliary materials are used during mixing and formation of a positive slurry. This can not only satisfy stronger adsorption performance between the positive active material, the binder, and the conductive agent, but also improve the energy density of the battery.

In some embodiments, the specific surface area of the positive electrode material is 0.6 m$^2$/g to 1.0 m$^2$/g.

In the positive electrode material provided in this application, $0.95 \leq a1 \leq 1$ and $1 \leq a1 \leq 1.05$ in Formula I of the chemical formula of the lithium-nickel transition metal oxide A. Generally, if a1<0.95, the material is lithium-deficient and has a low gram capacity; if a1>1.05, the material is lithium-rich and has excessive lithium residues on the surface of the material, consequently deteriorating gassing.

In the positive electrode material provided in this application, 0.7≤b1≤0.75, 0.75≤b1≤0.8, 0.8≤b1≤0.85, 0.85≤b1≤0.9, or 0.9≤b1≤0.98 in Formula I of the chemical formula of the lithium-nickel transition metal oxide A. The lithium-nickel transition metal oxide A in this application uses a laminar lithium transition metal oxide with a relatively high nickel content to improve the energy density of the battery. However, if b1>0.98, lithium-nickel disordering is severe, resulting in production of excessive gas. Specifically, the lithium-nickel transition metal oxide A may be $LiNi_{0.7}Co_{0.1}Mn_{0.2}O_2$, $LiNi_{0.75}Co_{0.1}Mn_{0.15}O_2$, $LiNi_{0.8}Co_{0.1}Mn_{0.1}O_2$, $LiNi_{0.85}Co_{0.05}Mn_{0.1}O_2$, $LiNi_{0.88}Co_{0.05}Mn_{0.07}O_2$, or $LiNi_{0.9}Co_{0.05}Mn_{0.05}O_2$, or may be a material obtained through modification and substitution of M and/or X based on the foregoing substances, where M is selected from any one or a combination of Al, Ti, Zr, Nb, Sr, Sc, Sb, Y, Ba, B, C, Co, and Mn, and X is selected from F and/or Cl.

In the positive electrode material provided in this application, 0.7≤b2≤0.75, 0.75≤b2≤0.8, 0.8≤b2≤0.85, 0.85≤b2≤0.9, or 0.9≤b2≤0.98 in Formula II of the chemical formula of the lithium-nickel transition metal oxide B. The lithium-nickel transition metal oxide B in this application uses a laminar lithium transition metal oxide with a relatively high nickel content to improve the energy density of the battery. However, if b2>0.98, lithium-nickel disordering is severe, resulting in production of excessive gas. Specifically, the lithium-nickel transition metal oxide B may be $LiNi_{0.7}Co_{0.1}Mn_{0.2}O_2$, $LiNi_{0.75}Co_{0.1}Mn_{0.15}O_2$, $LiNi_{0.8}Co_{0.1}Mn_{0.1}O_2$, $LiNi_{0.85}Co_{0.05}Mn_{0.1}O_2$, $LiNi_{0.88}Co_{0.05}Mn_{0.07}O_2$, or $LiNi_{0.9}Co_{0.05}Mn_{0.05}O_2$, or may be a material obtained through modification and substitution of M' and/or X' based on the foregoing substances, where M' is selected from any one or a combination of Al, Ti, Zr, Nb, Sr, Sc, Sb, Y, Ba, B, C, Co, and Mn, and X' is selected from F and/or Cl.

In the positive electrode material in this application, the lithium-nickel transition metal oxide A has a single-particle pressure-resistant strength of ≥100 MPa and the lithium-nickel transition metal oxide B has a single-particle pressure-resistant strength of ≥50 MPa. In this application, the lithium-nickel transition metal oxides with such two single-particle pressure-resistant strengths are mixed to obtain the positive electrode material, so as to improve the pressure-resistant performance of the entire positive electrode material. The monocrystalline/monocrystalline-like particles with a small particle size are mainly used to fill the gap between the secondary-particle powder with a large particle size, and withstand relatively small force; however, may be still crushed under the action of swelling of electrode plates or external force when the pressure-resistant strength is excessively low. The secondary particles with a larger particle size withstand most of the external force during the swelling or pressing of the electrode plates. Because there are a large quantity of crystalline boundaries inside the secondary particles, microcracks easily occur under the external force or during cycling. In this application, the mixed positive electrode material of the lithium-nickel transition metal oxide B with the single-particle pressure-resistant strength of ≥50 MPa and the lithium-nickel transition metal oxide A with the single-particle pressure-resistant strength of ≥100 MPa is selected to ensure that the pressure-resistant performance of the positive electrode material obtained through mixing can adapt to the external force during electrode plate preparation and cycling. In some embodiments, the single-particle pressure-resistant strength of the lithium-nickel transition metal oxide A is higher than the single-particle pressure-resistant strength of the lithium-nickel transition metal oxide B.

In the positive active material provided by this application, the single-particle pressure-resistant strength is a minimum pressure when one single secondary particle whose particle size fluctuates 10% above or below an average particle size $D_v50$ is crushed under external force.

In the positive electrode material provided in this application, the lithium-nickel transition metal oxide A has $D_v50$ of 8 µm to 15 µm, 8 µm to 10 µm, 10 µm to 12 µm, or 12 µm to 15 µm; $D_v10$ of 3 µm to 8 µm, 3 µm to 5 µm, or 5 µm to 8 µm; and $D_v90$ of 15 µm to 25 µm, 15 µm to 18 µm, 18 µm to 20 µm, or 20 µm to 25 µm.

In the positive electrode material provided in this application, the lithium-nickel transition metal oxide A is secondary particles that are composed of primary particles, and the particle size of the primary particles is 30 nm to 800 nm, 30 nm to 100 m, 100 nm to 200 nm, 200 nm to 500 nm, or 500 nm to 800 nm. Generally, an excessively small particle size of the primary particles causes a higher capacity and more side reaction with the electrolyte, while an excessively large particle size of the primary particles causes a lower capacity.

In some embodiments, the particle size of the primary particles is 200 nm to 500 nm.

In the positive electrode material provided in this application, the lithium-nickel transition metal oxide B has $D_v50$ of 1 µm to 7 µm, 1 µm to 3 µm, 3 µm to 5 µm, or 5 µm to 7 µm; $D_v10$ of 1 µm to 3 µm; and $D_v90$ of 5 µm to 10 µm, 5 µm to 8 µm, or 8 µm to 10 µm.

In some embodiments, the lithium-nickel transition metal oxide B has $D_v50$ of 3 µm to 5 µm.

In the positive electrode material provided in this application, a mass ratio of the lithium-nickel transition metal oxide A to the lithium-nickel transition metal oxide B is 10:1 to 1:1, 10:1 to 4:1, 4:1 to 2:1, or 2:1 to 1:1.

In some embodiments, the mass ratio of the lithium-nickel transition metal oxide A to the lithium-nickel transition metal oxide B is 4:1 to 2:1.

In the positive electrode material provided in this application, at least one active substance of the lithium-nickel transition metal oxide A and/or the lithium-nickel transition metal oxide B is surface-modified. The surface modification method includes one or a combination of doping the particle surface, oxide coating the particle surface, and carbon coating the particle surface. Doping and coating elements are selected from one or a combination of Mg, Al, Ti, Co, Fe, Cd, Zr, Mo, Zn, B, P, Cu, V, and Ag.

In the positive electrode material provided in this application, a surface-modified layer of the surface of the at least one active substance in the lithium-nickel transition metal oxide A and the lithium-nickel transition metal oxide B is a surface-modified layer, and a weight of the surface-modified layer is 0.01 wt % to 0.5 wt % of the weight of the positive electrode material.

A second aspect of this application provides a method for preparing the positive electrode material according to the first aspect of this application, including:
  providing a lithium-nickel transition metal oxide A;
  providing a lithium-nickel transition metal oxide B; and
  mixing the lithium-nickel transition metal oxide A and the lithium-nickel transition metal oxide B.

In the preparation method of the positive electrode material provided in this application, the lithium-nickel transition metal oxide A and/or the lithium-nickel transition metal oxide B may be surface-modified, for example, the lithium-nickel transition metal oxide A and/or lithium-nickel transition metal oxide B are separately surface-modified and then mixed, where the surface modification methods for the lithium-nickel transition metal oxide A and the lithium-nickel transition metal oxide B may be the same or different. Alternatively, the lithium-nickel transition metal oxide A and the lithium-nickel transition metal oxide B may be mixed first, and then the surface modification process is performed.

The method for preparing the positive electrode material provided in this application may include: providing the lithium-nickel transition metal oxide A. The method for providing the lithium-nickel transition metal oxide A should be known to those skilled in the art, for example, may include: mixing raw materials of the lithium-nickel transition metal oxide A and performing sintering to obtain the lithium-nickel transition metal oxide A. Those skilled in the art may select suitable raw materials and proportions based on element composition of the lithium-nickel transition metal oxide A. For example, the raw materials of the lithium-nickel transition metal oxide A may include a precursor of the lithium-nickel transition metal oxide A, a lithium source, an M source, an X source, and the like, and a proportion of each raw material is generally proportional to a proportion of each element in the lithium-nickel transition metal oxide A. More specifically, the precursor of the lithium-nickel transition metal oxide A may include but is not limited to $Ni_{0.7}Co_{0.1}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, and $0.9Ni_{0.9}Co_{0.05}Mn_{0.05}(OH)_2 \cdot 0.1Al_2(OH)_3$. The lithium source may be a compound containing lithium, and the compound containing lithium may include but is not limited to any one or a combination of $LiOH \cdot H_2O$, $LiOH$, $Li_2CO_3$, $Li_2O$, and the like. The M source may usually be a compound containing an M element, and the compound containing the M element may be one or more of an oxide containing at least one element of Zr, Zn, Cu, Cr, Mg, Fe, V, Ti, Sr, Sb, Y, W, and Nb, nitrate, and carbonate. The X source may be a compound containing the X element, and the compound containing the X element may include but is not limited to any one or a combination of LiF, NaCl, and the like. For another example, the sintering condition may be 800° C. with an oxygen concentration of ≥20%.

The method for preparing the positive electrode material provided in this application may include: providing the lithium-nickel transition metal oxide B. The method for providing the lithium-nickel transition metal oxide B should be known to those skilled in the art, for example, may include: mixing raw materials of the lithium-nickel transition metal oxide B and performing sintering to obtain the lithium-nickel transition metal oxide B. Those skilled in the art may select suitable raw materials and proportions based on element composition of the lithium-nickel transition metal oxide B. For example, the raw materials of the lithium-nickel transition metal oxide B may include a precursor of the lithium-nickel transition metal oxide B, a lithium source, an M' source, an X' source, and the like, and a proportion of each raw material is generally proportional to a proportion of each element in the lithium-nickel transition metal oxide B. More specifically, the precursor of the lithium-nickel transition metal oxide B may include but is not limited to $Ni_{0.7}Co_{0.1}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, and $0.9Ni_{0.9}Co_{0.05}Mn_{0.05}(OH)_2 \cdot 0.1Al_2(OH)_3$. The lithium source may be a compound containing lithium, and the compound containing lithium may include but is not limited to any one or a combination of $LiOH \cdot H_2O$, $LiOH$, $Li_2CO_3$, $Li_2O$, and the like. The M' source may usually be a compound containing an M' element, and the compound containing the M' element may be one or more of an oxide containing at least one element of Zr, Zn, Cu, Cr, Mg, Fe, V, Ti, Sr, Sb, Y, W, and Nb, nitrate, and carbonate. The X' source may be a compound containing the X' element, and the compound containing the X' element may include but is not limited to any one or a combination of LiF, NaCl, and the like. For another example, the sintering condition may be 700° C. to 900° C. with an oxygen concentration of ≥15%.

The method for preparing the positive electrode material provided in this application may further include: modifying a surface of the lithium-nickel transition metal oxide A and/or the lithium-nickel transition metal oxide B. The surface modification method for the lithium-nickel transition metal oxide A and/or the lithium-nickel transition metal oxide B should be known to those skilled in the art, and for example, may include: sintering the lithium-nickel transition metal oxide A and/or the lithium-nickel transition metal oxide B in the presence of a compound containing doping elements, a compound containing a coating element, or a carbon-coated precursor, to perform surface modification on the surface of the lithium-nickel transition metal oxide A and/or the lithium-nickel transition metal oxide B. Those skilled in the art may select, based on the composition of the surface modifier, a suitable compound containing doping elements, carbon-coated precursor, or compound containing a coating element. For example, the lithium-nickel transition metal oxide A and/or lithium-nickel transition metal oxide B is mixed in a mixer with any one or a combination of a certain amount of the compound containing doping elements, the compound containing a coating element, and the carbon-coated precursor, and then sintered in an atmosphere furnace to form the lithium-nickel transition metal oxide A and/or the lithium-nickel transition metal oxide B. For another example, the compound containing the doping metal element may be any one or a combination of an oxide containing at least one element of Mg, Al, Ti, Fe, Cd, Zr, Mo, Zn, B, Cu, V, and Ag, nitrate, phosphate, and the like. The compound containing the coating element may be an oxide containing one or more elements of Al, Ba, Zn, Ti, Co, W, Y, Si, Sn, B, and P, nitrate, phosphate, carbonate, and the like. For another example, an amount of the doping metal element may be 0 wt % to 2 wt %, an amount of the coating element may be 0 wt % to 2 wt %, and the sintering condition may be 200° C. to 700° C.

The method for preparing the positive electrode material provided in this application may further include: mixing the lithium-nickel transition metal oxide A with the lithium-nickel transition metal oxide B, where the lithium-nickel transition metal oxide A and/or the lithium-nickel transition metal oxide B may be surface-modified, or the lithium-nickel transition metal oxide A and/or the lithium-nickel transition metal oxide B may be not surface-modified. For example, the lithium-nickel transition metal oxide A and the lithium-nickel transition metal oxide B are mixed evenly in a mass ratio of 10:1 to 1:1.

A third aspect of this application provides an electrochemical energy storage apparatus, including the positive electrode material according to the first aspect of this application.

In the electrochemical energy storage apparatus according to the third aspect of this application, it should be noted that the electrochemical energy storage apparatus may be a super capacitor, a lithium-ion battery, a lithium metal battery, or a sodium ion battery. This embodiment of this application illustrates only an embodiment in which the electrochemical energy storage apparatus is a lithium-ion battery, but this application is not limited thereto.

The lithium-ion battery includes a positive electrode plate, a negative electrode plate, a separator placed between the positive electrode plate and the negative electrode plate, and an electrolyte, where the positive electrode plate includes the positive electrode material according to the first aspect of this application. The method for preparing the lithium-ion battery should be known to those skilled in the art, for example, each of the positive electrode plate, the separator, and the negative electrode plate may be a layer, and may be cut to a target size and then stacked in order. The stack may be further wound to a target size to form a battery core, and may be further combined with an electrolyte to form a lithium-ion battery.

In the lithium-ion battery, the positive electrode plate includes a positive current collector and a positive active substance layer on the positive current collector, and the positive active substance layer includes the positive electrode material according to the first aspect of this application, a binder, and a conductive agent. Those skilled in the art may select a suitable method for preparing the positive electrode plate, and for example, the following steps may be included: mixing the positive electrode material, the binder, and the conductive agent to form a slurry, and applying the slurry on the positive current collector. The binder usually includes a fluoropolyene-based binder, and water is generally a good solvent relative to the fluoropolyene-based binder, that is, the fluoropolyene-based binder usually features good solubility in water, for example, the fluoropolyene-based binder may be a derivative including, but not limited to, polyvinylidene fluoride (PVDF), vinylidene fluoride copolymer, or the like, or their modified derivatives (for example, carboxylic acid, acrylic, or acrylonitrile). In the positive active substance layer, a mass percent composition of the binder cannot be excessively high due to poor conductivity of the binder itself. In some embodiments, the mass percent composition of the binder in the positive active substance layer is less than or equal to 0.5 wt % to 3 wt % to obtain a lower electrode impedance.

In the lithium-ion battery, the conductive agent of the positive electrode plate may be a variety of conductive agents applicable to the lithium-ion (secondary) batteries in the art, for example, may include, but is not limited to, acetylene black, conductive carbon black, vapor grown carbon fiber (VGCF), carbon nanotube (CNT), Ketjen black, or the like. The weight of the conductive agent may account for 1 wt % to 10 wt % of the total weight of the positive active substance layer. More specifically, a weight ratio of the conductive agent to the positive electrode material in the positive electrode plate is greater than or equal to 1.0 wt % to 5.0 wt %.

In the lithium-ion battery, the positive current collector of the positive electrode plate may usually be a layer, and the positive current collector may usually be a structure or part that can collect current. The positive current collector may be a variety of materials suitable for use as the positive current collector of the lithium-ion battery in the art. For example, the positive current collector may include but is not limited to metal foil, and more specifically, may include but is not limited to copper foil, aluminum foil, and the like.

In the lithium-ion battery, the negative electrode plate usually includes a negative current collector and a negative active substance layer on the surface of the negative current collector, and the negative active substance layer usually includes a negative active substance. The negative active substance may be various materials applicable to the negative active substance for the lithium-ion battery in the art, for example, may include but is not limited to any one or a combination of graphite, soft carbon, hard carbon, carbon fiber, mesophase carbon microbeads, silicon-based material, tin-based material, lithium titanate, or other metals capable of forming alloys with lithium. The graphite may be selected from any one or a combination of artificial graphite, natural graphite and modified graphite. The silicon-based material may be selected from any one or a combination of elemental silicon, silicon oxide, silicon carbon composite, and silicon alloy. The tin-based material may be selected from any one or a combination of elemental tin, tin oxide, and tin alloy. The negative current collector may usually be a structure or part that can collect current. The negative current collector may be a variety of materials suitable for use as the negative current collector of the lithium-ion battery in the art. For example, the negative current collector may include but is not limited to metal foil, and more specifically, may include but is not limited to copper foil and the like.

In the lithium-ion battery, the separator may be a variety of materials applicable to the separator for the lithium-ion battery in the art, for example, may include but is not limited to any one or a combination of polyethylene, polypropylene, polyvinylidene fluoride, aramid, polyethylene terephthalate, polytetrafluoroethylene, polyacrylonitrile, polyimide, polyamide, polyester, natural fiber, and the like.

In the lithium-ion battery, the electrolyte may be a variety of electrolytes applicable to the lithium-ion battery in the art, for example, the electrolyte generally includes an electrolyte substance and a solvent, the electrolyte substance may generally include a lithium salt or the like, more specifically, the lithium salt may be an inorganic lithium salt and/or organic lithium salt or the like, and specifically, the lithium salt may be selected from, including but not limited to, any one or a combination of $LiPF_6$, $LiBF_4$, $LiN(SO_2F)_2$ (LiFSI for short), $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, a concentration of the electrolyte substance may be between 0.8 mol/L to 1.5 mol/L. The solvent may be various solvents applicable to the electrolyte of the lithium-ion battery in the art, and the solvent of the electrolyte is usually a non-aqueous solvent, preferably may be an organic solvent, and specifically, may include but is not limited to any one or a combination of ethylene carbonate, propylene carbonate, butylene carbonate, pentene carbonate, dimethyl carbonate, diethyl carbonate, dipropyl carbonate, ethyl methyl carbonate, and the like, or halogenated derivatives thereof.

The following further describes beneficial effects of this application in combination with Examples.

In order to make the objectives, technical solutions, and beneficial technical effects of this application clearer, the following further describes this application in detail in combination with Examples. However, it should be understood that Examples of this application are merely intended to explain this application, and are not intended to limit this application, and Examples of this application are not limited to Examples provided in the specification. Examples whose experimental or operating conditions are not specified are made under conventional conditions, or under conditions recommended by the material suppliers.

In addition, it should be understood that the one or more method steps mentioned in this application do not preclude existence of other method steps before and after the combination steps or insertion of other method steps between those explicitly mentioned steps, unless otherwise specified. It should also be understood that the combination and connection relationship between one or more devices/apparatuses mentioned in this application does not preclude existence of other devices/apparatuses before or after the combination apparatuses or insertion of other apparatuses between those explicitly mentioned devices/apparatuses, unless otherwise specified. Moreover, unless otherwise specified, numbers of the method steps are merely a tool for identifying the method steps, but are not intended to limit the order of the method steps or to limit the implementable scope of this application. In the absence of substantial changes in the technical content, alteration or adjustment of their relative relationships shall be also considered as the implementable scope of this application.

The reagents, materials, and instruments used in the following Examples are commercially available, unless otherwise specially specified.

Example 1

1. Preparation of the Positive Electrode Material

1) Preparation of the precursor of the lithium-nickel transition metal oxides A and B: Nickel sulfate, manganese sulfate, and cobalt sulfate were configured in a molar ratio to obtain a solution with a concentration of 1 mol/L, and the precursor of the large-particle lithium-nickel transition metal oxide A with a particle size of 10 μm was prepared by using the hydroxide co-precipitation method. Nickel sulfate, manganese sulfate, and cobalt sulfate were configured in a molar ratio to obtain a solution with a concentration of 1 mol/L, and the precursor of the small-particle lithium-nickel transition metal oxide B with a particle size of 3 μm was prepared by using the hydroxide co-precipitation method. In the process of preparing the precursors, the particle size can be controlled by controlling a reaction time, a pH value, and an ammonia concentration during co-precipitation.

2) Preparation method of the lithium-nickel transition metal oxide a (polycrystalline $LiNi_{0.8}Co_{0.1}Mn_{0.1}O_2$):

The precursor $Ni_{0.8}Co_{0.1}Mn_{0.1}(OH)_2$ of the lithium-nickel transition metal oxide A and the Li-containing compound $LiOH.H_2O$ were mixed in a mixer in a molar ratio of 1:1.05, and then sintered in the atmosphere furnace at 800° C., followed by cooling and mechanical grinding, to obtain the lithium-nickel transition metal oxide A.

The lithium-nickel transition metal oxide A and a 0.4 wt % compound $Al_2O_3$ containing the Al coating element were mixed in a mixer, and then sintered in an atmosphere furnace at 500° C. for 5 h, to form a coating layer of the lithium-nickel transition metal oxide A, that is, the surface-modified lithium-nickel transition metal oxide A was obtained.

3) Preparation method of the lithium-nickel transition metal oxide B (monocrystalline $LiNi_{0.8}Co_{0.1}Mn_{0.1}O_2$):

The precursor $Ni_{0.8}Co_{0.1}Mn_{0.1}(OH)_2$ of the lithium-nickel transition metal oxide B and the Li-containing compound $LiOH.H_2O$ were mixed in a mixer in a molar ratio of 1:1.05, and then sintered in an atmosphere furnace at 850° C., followed by cooling and air-flow powder grinding, to obtain the lithium-nickel transition metal oxide B.

The lithium-nickel transition metal oxide B and a 0.2 wt % compound $Al_2O_3$ containing the Al coating element were mixed in a mixer, and then sintered in an atmosphere furnace at 500° C. for 5 h, to form a coating layer of the lithium-nickel transition metal oxide B, that is, the surface-modified lithium-nickel transition metal oxide B was obtained.

4) The surface-modified lithium-nickel transition metal oxide A and the surface-modified lithium-nickel transition metal oxide B are evenly mixed in a mass ratio of 8:2, to obtain the positive electrode material of Example 1.

2. Preparation of a Battery

1) Preparation of a Positive Electrode Plate

Step 1: The prepared positive electrode material, a binder polyvinylidene fluoride, and a conductive agent acetylene black were mixed in a mass ratio of 98:1:1. N-methylpyrrolidone (NMP) was added. The resulting mixture was stirred by using a vacuum mixer until the mixture was stable and uniform, to obtain a positive slurry. The positive slurry was applied uniformly on an aluminum foil with a thickness of 12 μm.

Step 2: The coated electrode plate was dried in an oven at 100° C. to 130° C., followed by cold pressing and cutting, to obtain the positive electrode plate.

2) Preparation of a Negative Electrode Plate

A negative active material graphite, a thickener sodium carboxymethyl cellulose, a binder styrene-butadiene rubber, and an conductive agent acetylene black were mixed in a mass ratio of 97:1:1:1. Deionized water was added. The resulting mixture was stirred by using a vacuum mixer until the mixture was stable and uniform, to obtain a negative slurry. The negative slurry was uniformly applied onto a copper foil with a thickness of 8 μm. The copper foil was dried at room temperature, and then dried in an oven at 120° C. for 1 h. Then the copper foil was cold-pressed and cut to obtain a negative electrode plate.

3) Preparation of an Electrolyte

A mixed solution of ethyl carbonate (EC), ethyl methyl carbonate (EMC), and diethyl carbonate (DEC) was used as an organic solvent, where a volume ratio of EC, EMC and DEC was 20:20:60. A fully dried lithium salt was then dissolved and evenly mixed in the organic solvent by using an argon atmosphere glove box with a water content of <10 ppm, to obtain an electrolyte. A concentration of the lithium salt is 1 mol/L.

4) Preparation of a Separator

A polypropylene separator with a thickness of 12 μm was selected for use.

5) Preparation of a Battery

The positive electrode plate, the separator, and the negative electrode plate are stacked in order, so that the separator was placed between the positive and negative electrode plates, and has an effect of separation. Then the stack was wound to obtain a square bare battery. The bare battery was placed in an aluminum-plastic film, and then baked at 80° C. for dehydrating. A finished battery was obtained after steps of injecting the corresponding non-aqueous electrolyte, sealing, standing, hot and cold pressing, technical conversion, clamping, and aging.

Example 2

Example 2 is basically the same as Example 1, except for the preparation method of the positive electrode material: A particle size of the precursor of the lithium-nickel transition metal oxide B is 4 μm, and a mass ratio of the surface-modified lithium-nickel transition metal oxide A to the surface-modified lithium-nickel transition metal oxide B is 7:3.

Example 3

Example 3 is basically the same as Example 1, except for the preparation method of the positive electrode material: A particle size of the precursor of the lithium-nickel transition metal oxide B is 6 μm, and a mass ratio of the surface-modified lithium-nickel transition metal oxide A to the surface-modified lithium-nickel transition metal oxide B is 6:4.

Example 4

Example 4 is basically the same as Example 1, except for the preparation method of the positive electrode material: A particle size of the precursor of the lithium-nickel transition metal oxide B is 7 m, and a mass ratio of the surface-modified lithium-nickel transition metal oxide A to the surface-modified lithium-nickel transition metal oxide B is 5:5.

Example 5

Example 5 is basically the same as Example 1, except for the preparation method of the positive electrode material: A particle size of the precursor of the lithium-nickel transition metal oxide B is 2 μm, and a mass ratio of the surface-modified lithium-nickel transition metal oxide A to the surface-modified lithium-nickel transition metal oxide B is 9:1.

Example 6

Example 6 is basically the same as Example 2, except for the preparation method of the positive electrode material. The precursor of the lithium-nickel transition metal oxide A (polycrystalline $LiNi_{0.90}Co_{0.05}Mn_{0.05}O_2$) is $Ni_{0.90}Co_{0.05}Mn_{0.05}(OH)_2$ with a particle size of 15 μm, and the precursor of the lithium-nickel transition metal oxide B (monocrystalline $LiNi_{0.9}Co_{0.95}Mn_{0.05}O_2$) is $Ni_{0.90}Co_{0.05}Mn_{0.05}(OH)_2$.

Example 7

Example 7 is basically the same as Example 2, except for the preparation method of the positive electrode material. The precursor of the lithium-nickel transition metal oxide A (polycrystalline $LiNi_{0.70}Co_{0.15}Mn_{0.15}O_2$) is $Ni_{0.70}Co_{0.15}Mn_{015}(OH)_2$ with a particle size of 12 μm, and the precursor of the lithium-nickel transition metal oxide B (monocrystalline $LiNi_{0.96}Co_{0.02}Mn_{0.02}O_2$) is $Ni_{0.96}Co_{0.02}Mn_{0.02}(OH)_2$.

Example 8

Example 8 is basically the same as Example 2, except for the preparation method of the positive electrode material. The precursor of the lithium-nickel transition metal oxide A (polycrystalline $LiNi_{0.96}Co_{0.15}Mn_{0.02}O_2$) is $Ni_{0.96}Co_{0.02}Mn_{0.02}(OH)_2$ with a particle size of 8 μm, and the precursor of the lithium-nickel transition metal oxide B (monocrystalline $LiNi_{0.70}Co_{0.15}Mn_{0.15}O_2$) is $Ni_{0.70}Co_{0.15}Mn_{0.15}(OH)_2$.

Example 9

Example 9 is basically the same as Example 2, except for the preparation method of the positive electrode material. The precursor $Ni_{0.8}Co_{0.1}Mn_{0.1}(OH)_2$ of the lithium-nickel transition metal oxide A, the Li-containing compound $LiOH.H_2O$, and the M-containing compound $ZrO_2$ were mixed in a mixer in a molar ratio of 0.995:1.05:0.005, and then sintered in an atmosphere furnace at 800° C., followed by cooling and mechanical grinding, to obtain the lithium-nickel transition metal oxide A (polycrystalline $Li(Ni_{0.8}Co_{0.1}Mn_{0.1})_{0.995}Zr_{0.005}O_2$).

Example 10

Example 10 is basically the same as Example 2, except for the preparation method of the positive electrode material. The precursor $Ni_{0.8}Co_{0.1}Mn_{0.1}(OH)_2$ of the lithium-nickel transition metal oxide B, the Li-containing compound $LiOH.H_2O$, and the M'-containing compound $ZrO_2$ were mixed in a mixer in a molar ratio of 0.995:1.05:0.005, and then sintered in an atmosphere furnace at 850° C., followed by cooling and mechanical grinding, to obtain the lithium-nickel transition metal oxide B (monocrystalline $Li(Ni_{0.8}Co_{0.1}Mn_{0.1})_{0.995}Zr_{0.005}O_2$).

Example 11

Example 11 is basically the same as Example 2, except for the preparation method of the positive electrode material. The precursor $Ni_{0.8}Co_{0.1}Mn_{0.1}(OH)_2$ of the lithium-nickel transition metal oxide A, the Li-containing compound $LiOH.H_2O$, and the X-containing compound $LiF$ were mixed in a mixer in a molar ratio of 1.1.05:0.01, and then sintered in an atmosphere furnace at 800° C., followed by cooling and mechanical grinding, to obtain the lithium-nickel transition metal oxide A (polycrystalline $LiNi_{0.8}Co_{0.1}Mn_{0.1}O_{1.99}F_{0.01}$).

Example 12

Example 12 is basically the same as Example 2, except for the preparation method of the positive electrode material: The precursor $Ni_{0.8}Co_{0.1}Mn_{0.1}(OH)_2$ of the lithium-nickel transition metal oxide B, the Li-containing compound $LiOH.H_2O$, and the X'-containing compound $LiF$ were mixed in a mixer in a molar ratio of 1:1.05:0.01, and then sintered in an atmosphere furnace at 800° C., followed by cooling and mechanical grinding, to obtain the lithium-nickel transition metal oxide B (monocrystalline $LiNi_{0.8}Co_{0.1}Mn_{0.1}O_{1.99}F_{0.01}$).

Example 13

Example 13 is basically the same as Example 2, except for the preparation method of the positive electrode material. A particle size of the precursor of the lithium-nickel transition metal oxide A is 8 μm.

Example 14

Example 14 is basically the same as Example 2, except for the preparation method of the positive electrode material: A particle size of the precursor of the lithium-nickel transition metal oxide A is 15 μm.

Example 15

Example 15 is the same as Example 1, except for no coating treatment in the preparation of the lithium-nickel transition metal oxide A and the lithium-nickel transition metal oxide B.

Comparative Example 1

Compared with Example 1, the difference lies in the preparation method of the positive electrode material. There is only the lithium-nickel transition metal oxide A (polycrystalline $LiNi_{0.8}Co_{0.1}Mn_{0.1}O_2$) in the positive active material, without lithium-nickel transition metal oxide B (monocrystalline $LiNi_{0.8}Co_{0.1}Mn_{0.1}O_2$).

Comparative Example 2

Compared with Example 1, the difference lies in the preparation method of the positive electrode material. There is only the lithium-nickel transition metal oxide B (monocrystalline $LiNi_{0.8}Co_{0.1}Mn_{0.1}O_2$) in the positive active material, without the lithium-nickel transition metal oxide A (polycrystalline $LiNi_{0.8}Co_{0.1}Mn_{0.1}O_2$).

Comparative Example 3

Compared with Example 2, the difference lies in the preparation method of the positive electrode material: The lithium-nickel transition metal oxide B is polycrystalline $LiNi_{0.8}Co_{0.1}Mn_{0.1}O_2$, and a particle size of the precursor of the lithium-nickel transition metal oxide B is 3 μm.

Comparative Example 4

Compared with Example 1, the difference lies in the preparation method of the positive electrode material. The precursor of the lithium-nickel transition metal oxide B (monocrystalline $LiNi_{0.5}Co_{0.2}Mn_{0.3}O_2$) is $Ni_{0.5}Co_{0.2}Mn_{0.3}(OH)_2$, and a mass ratio of the surface-modified lithium-nickel transition metal oxide A to the surface-modified lithium-nickel transition metal oxide B is 7:3.

Comparative Example 5

Compared with Example 1, the difference lies in the preparation method of the positive electrode material: The precursor of the lithium-nickel transition metal oxide A (polycrystalline $LiNi_{0.8}Co_{0.2}Mn_{0.3}O_2$) is $Ni_{0.5}Co_{0.2}Mn_{0.3}(OH)_2$, and a mass ratio of the surface-modified lithium-nickel transition metal oxide A to the surface-modified lithium-nickel transition metal oxide B is 7:3.

Comparative Example 6

Compared with Example 1, the difference lies in the preparation method of the positive electrode material. A particle size of the precursor of the lithium-nickel transition metal oxide B is 7 μm, and a mass ratio of the surface-modified lithium-nickel transition metal oxide A to the surface-modified lithium-nickel transition metal oxide B is 2:8.

Comparative Example 7

Compared with Example 1, the difference lies in the preparation method of the positive electrode material. A particle size of the precursor of the lithium-nickel transition metal oxide B is 1 μm, and a mass ratio of the surface-modified lithium-nickel transition metal oxide A to the surface-modified lithium-nickel transition metal oxide B is 2:8.

FIG. 1 is a scanning electron microscope graph of the positive electrode material prepared in Example 1 of this application. As shown in FIG. 1, the particles are not crushed, gaps between the polycrystalline large particles are filled with monocrystalline particles, and the compacted density is high.

Figure 2:
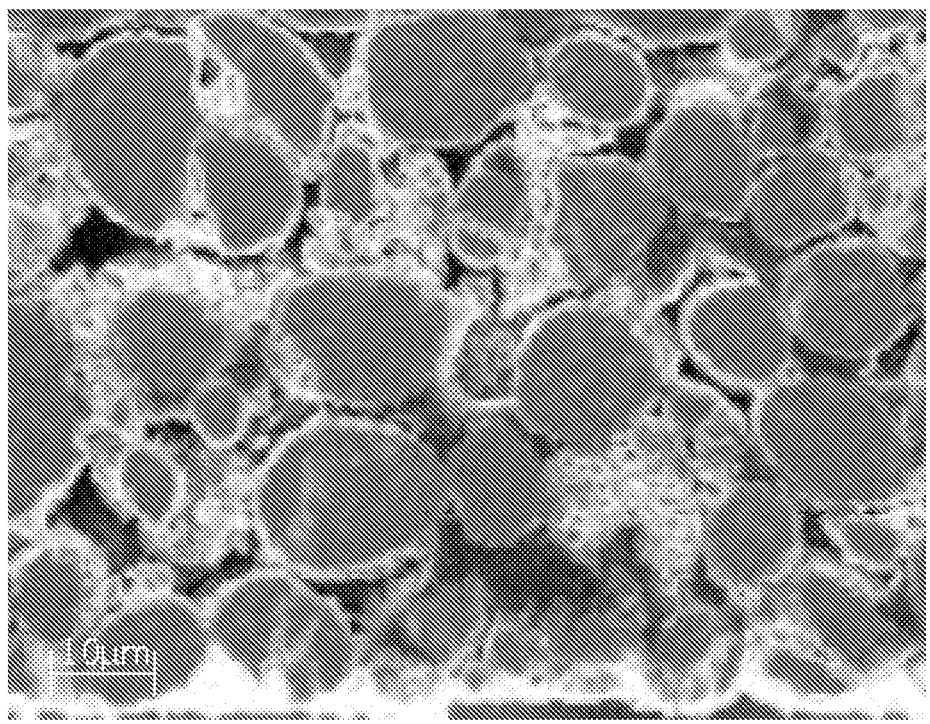
FIG. 2 is a scanning electron microscope graph of a positive electrode material prepared according to Comparative Example 1 of this application.

FIG. 2 is a scanning electron microscope graph of the positive electrode material prepared in Comparative Example 1 of this application. As shown in FIG. 2, the particles are crushed, causing severe gassing, there are a lot of gaps between the particles, and the compacted density is low.

II. Test Methods

1. Test Method of $D_{104}$

A diffraction pattern of the positive electrode material was obtained through test using an XRD instrument, and a diffraction peak of the crystal plane (104) was calculated.

Then, the Scherrer equation was used for calculation: $D=k\lambda/\beta \cos \theta$, where:

D indicates an average crystal size perpendicular to the (104) crystal plane;

K is a Scherrer constant 0.89;

θ is a diffraction angle; and

λ is a wavelength of incident X-ray.

The test results are shown in Table 1.

2. ΔPSD Test Method

Actual values of $D_v10$, $D_v50$, and $D_v90$ of the positive electrode material were measured by using a laser particle size tester, and then ΔPSD of the positive electrode material was calculated according to the formula $\Delta PSD=(D_v90-D_v10)/D_v50$.

The test results are shown in Table 1.

3. Pressure-Resistant Strength Test Method

1) A sample was placed on a platform.

2) An indenter was pressed down to the sample at a constant speed until the indenter comes in contact with the sample.

3) The pressure and displacement of the indenter started to be recorded at the moment of contact.

4) The particles were pressed at a constant speed until the particles were crushed.

The test results are shown in Table 1.

4. Compacted Density Test Method

1) An electrode plate was cut to a film 1000 mm long.

2) The positive electrode plate was pressed under certain pressure until its film reached a length of 1006 mm under the effect of extendibility of an aluminum foil.

3) Punching was performed to obtain 1540.25 mm² small round pieces, and the weight and thickness of the small round pieces were measured, to calculate the compacted density.

The test results are shown in Table 2.

5. Test Method for High Temperature Gassing of a Battery

The battery was charged at 1 C to 4.2V and then placed in a thermostat at 70° C. for 30 days. A volume swelling rate of the battery was obtained by measuring an initial volume of the battery and the volume obtained after standing for 30 days.

Volume swelling rate of the battery (%)=(Volume after standing for 30 days/Initial volume−1)× 100%

The test results are shown in Table 2.

6. Battery Capacity Test

The lithium-ion battery was placed at constant temperature of 25 for 2 h charged to 4.2V based on ⅓ C at 2.8V to 4.2V, and then charged to a current of 0.05 mA at a constant voltage of 4.2V, and after standing for 5 min, then discharged to 2.8V based on SC for 5 min. A capacity of the lithium-ion battery was recorded. The test results are shown in Table 2.

TABLE 1

Composition of the positive electrode material in Examples 1 to 15 and Comparative Examples 1 to 7

| | Lithium-nickel transition metal oxide A | | | Lithium-nickel transition metal oxide B | | | Mixed material | |
|---|---|---|---|---|---|---|---|---|
| | Substance | $D_v 50$ (μm) | Pressure-resistant strength/MPa | Substance | $D_v 50$ (μm) | Pressure-resistant strength/MPa | A:B mass ratio | D104*ΔPSD (nm) |
| Example 1 | Polycrystalline $LiNi_{0.8}Co_{0.1}Mn_{0.1}O_2$ | 10 | 120 | Monocrystalline $LiNi_{0.8}Co_{0.1}Mn_{0.1}O_2$ | 3 | 89 | 8:2 | 100 |
| Example 2 | Polycrystalline $LiNi_{0.8}Co_{0.1}Mn_{0.1}O_2$ | 10 | 120 | Monocrystalline $LiNi_{0.8}Co_{0.1}Mn_{0.1}O_2$ | 4 | 91 | 7:3 | 183 |
| Example 3 | Polycrystalline $LiNi_{0.8}Co_{0.1}Mn_{0.1}O_2$ | 10 | 120 | Monocrystalline $LiNi_{0.8}Co_{0.1}Mn_{0.1}O_2$ | 6 | 86 | 6:4 | 294 |
| Example 4 | Polycrystalline $LiNi_{0.8}Co_{0.1}Mn_{0.1}O_2$ | 10 | 120 | Monocrystalline $LiNi_{0.8}Co_{0.1}Mn_{0.1}O_2$ | 7 | 92 | 5:5 | 439 |
| Example 5 | Polycrystalline $LiNi_{0.8}Co_{0.1}Mn_{0.1}O_2$ | 10 | 120 | Monocrystalline $LiNi_{0.8}Co_{0.1}Mn_{0.1}O_2$ | 2 | 87 | 9:1 | 56 |
| Example 6 | Polycrystalline $LiNi_{0.90}Co_{0.05}Mn_{0.05}O_2$ | 15 | 150 | Monocrystalline $LiNi_{0.9}Co_{0.05}Mn_{0.05}O_2$ | 3 | 78 | 7:3 | 109 |
| Example 7 | Polycrystalline $LiNi_{0.7}Co_{0.15}Mn_{0.15}O_2$ | 12 | 120 | Monocrystalline $LiNi_{0.96}Co_{0.02}Mn_{0.02}O_2$ | 3 | 71 | 7:3 | 108 |
| Example 8 | Polycrystalline $LiNi_{0.96}Co_{0.02}Mn_{0.02}O_2$ | 8 | 80 | Monocrystalline $LiNi_{0.70}Co_{0.15}Mn_{0.15}O_2$ | 3 | 68 | 7:3 | 111 |
| Example 9 | Polycrystalline $Li(Ni_{0.8}Co_{0.1}Mn_{0.1})_{0.995}Zr_{0.005}O_2$ | 10 | 124 | Monocrystalline $LiNi_{0.8}Co_{0.1}Mn_{0.1}O_2$ | 3 | 89 | 7:3 | 101 |
| Example 10 | Polycrystalline $LiNi_{0.8}Co_{0.1}Mn_{0.1}O_2$ | 10 | 120 | Monocrystalline $LiNi_{0.8}Co_{0.1}Mn_{0.1})_{0.995}Zr_{0.005}O_2$ | 3 | 85 | 7:3 | 110 |
| Example 11 | Polycrystalline $LiNi_{0.8}Co_{0.1}Mn_{0.1}O_{1.99}F_{0.01}$ | 10 | 115 | Monocrystalline $LiNi_{0.8}Co_{0.1}Mn_{0.1}O_2$ | 3 | 89 | 7:3 | 109 |
| Example 12 | Polycrystalline $LiNi_{0.8}Co_{0.1}Mn_{0.1}O_2$ | 10 | 120 | Monocrystalline $LiNi_{0.8}Co_{0.1}Mn_{0.1}O_{1.99}F_{0.01}$ | 3 | 84 | 7:3 | 109 |
| Example 13 | Polycrystalline $LiNi_{0.8}Co_{0.1}Mn_{0.1}O_2$ | 8 | 120 | Monocrystalline $LiNi_{0.8}Co_{0.1}Mn_{0.1}O_2$ | 4 | 55 | 7:3 | 201 |
| Example 14 | Polycrystalline $LiNi_{0.8}Co_{0.1}Mn_{0.1}O_2$ | 15 | 120 | Monocrystalline $LiNi_{0.8}Co_{0.1}Mn_{0.1}O_2$ | 4 | 45 | 7:3 | 195 |
| Example 15 | Polycrystalline $LiNi_{0.8}Co_{0.1}Mn_{0.1}O_2$ | 10 | 120 | Monocrystalline $LiNi_{0.8}Co_{0.1}Mn_{0.1}O_2$ | 3 | 89 | 8:2 | 100 |
| Comparative Example 1 | Polycrystalline $LiNi_{0.8}Co_{0.1}Mn_{0.1}O_2$ | 10 | 120 | \ | \ | \ | \ | 64 |
| Comparative Example 2 | \ | \ | \ | Monocrystalline $LiNi_{0.8}Co_{0.1}Mn_{0.1}O_2$ | 3 | 89 | \ | 215 |
| Comparative Example 3 | Polycrystalline $LiNi_{0.8}Co_{0.1}Mn_{0.1}O_2$ | 10 | 120 | Polycrystalline $LiNi_{0.8}Co_{0.1}Mn_{0.1}O_2$ | 3 | 100 | 7:3 | 100 |
| Comparative Example 4 | Polycrystalline $LiNi_{0.8}Co_{0.1}Mn_{0.1}O_2$ | 10 | 120 | Monocrystalline $LiNi_{0.8}Co_{0.2}Mn_{0.3}O_2$ | 3 | 76 | 7:3 | 99 |
| Comparative Example 5 | Polycrystalline $LiNi_{0.5}Co_{0.2}Mn_{0.3}O_2$ | 10 | 160 | Monocrystalline $LiNi_{0.8}Co_{0.1}Mn_{0.1}O_2$ | 3 | 89 | 7:3 | 103 |
| Comparative Example 6 | Polycrystalline $LiNi_{0.8}Co_{0.1}Mn_{0.1}O_2$ | 10 | 120 | Monocrystalline $LiNi_{0.8}Co_{0.1}Mn_{0.1}O_2$ | 7 | 89 | 2:8 | 503 |
| Comparative Example 7 | Polycrystalline $LiNi_{0.8}Co_{0.1}Mn_{0.1}O_2$ | 10 | 100 | Monocrystalline $LiNi_{0.8}Co_{0.1}Mn_{0.1}O_2$ | 1 | 89 | 2:8 | 45 |

TABLE 2

Performance test in Examples 1 to 15 and Comparative Examples 1 to 7

| | Compacted density (g/cm³) | 1/3 C capacity (mAh/g) | Storage volume swelling rate |
|---|---|---|---|
| Example 1 | 3.50 | 196 | 78% |
| Example 2 | 3.55 | 195 | 75% |
| Example 3 | 3.55 | 194 | 72% |
| Example 4 | 3.45 | 193 | 81% |
| Example 5 | 3.45 | 196 | 84% |
| Example 6 | 3.55 | 198 | 81% |
| Example 7 | 3.55 | 192 | 90% |
| Example 8 | 3.55 | 194 | 99% |
| Example 9 | 3.55 | 195 | 69% |
| Example 10 | 3.55 | 195 | 72% |
| Example 11 | 3.55 | 195 | 69% |
| Example 12 | 3.55 | 195 | 72% |
| Example 13 | 3.50 | 196 | 85% |
| Example 14 | 3.55 | 196 | 91% |
| Example 15 | 3.50 | 197 | 82% |
| Comparative Example 1 | 3.35 | 197 | 114% |
| Comparative Example 2 | 3.45 | 191 | 105% |
| Comparative Example 3 | 3.50 | 197 | 168% |
| Comparative Example 4 | 3.50 | 185 | 75% |
| Comparative Example 5 | 3.50 | 173 | 55% |
| Comparative Example 6 | 3.35 | 187 | 105% |
| Comparative Example 7 | 3.35 | 197 | 156% |

Tables 1 and 2 list specific parameters and performance test results of the positive electrode material in Examples 1 to 15 and Comparative Examples 1 to 7. It can be seen from comparison between Examples and Comparative Examples that, in the Examples of this application, the lithium-nickel transition metal oxide A with large lithium particles was mixed with the lithium-nickel transition metal oxide B with small lithium particles, and the degree of crystallinity and particle size distribution of the mixed high-nickel active material were controlled to mitigate the particle crushing problem during cold pressing and cycling, improve the compacted density of the high-nickel powder, and ensure lower gassing and good cycle performance.

In Comparative Example 1 and Comparative Example 2, the positive electrode material contained only secondary particles or monocrystalline particles, and the compacted density of the prepared positive electrode plate was relatively low, which is inconducive to increasing of the volume energy density of the battery. In addition, the positive active substances in Comparative Example 1 and Comparative Example 2 were prone to particle crushing during cold pressing of the electrode plate and cycling, resulting in a severe gassing problem and a relatively high volume swelling rate of the battery. In Comparative Example 3, although a high-nickel positive electrode material with large and small particle sizes was used, the secondary particles with a small particle size had a large specific surface area and higher residual lithium content on the surface, degrading gassing performance of the lithium-ion battery. In Comparative Example 4 and Comparative Example 5, $LiNi_{0.5}Co_{0.2}Mn_{0.3}O_2$ with relatively low nickel content was included in the mixed positive electrode material. Although the gassing problem of the lithium-ion battery was mitigated by controlling the degree of crystallinity and particle size distribution of the mixed high-nickel active material, the high energy density requirements of the battery cannot be met. In Comparative Example 6, $D_{104} \times \Delta PSD$ of the mixed high-nickel positive electrode material was excessively high, indicating that the particle size distribution of the material was excessively large and the relative content of fine powder with a small particle size was excessively high, and therefore the cycle performance was poor and the gassing problem was severe. In Comparative Example 7, the $D_{104} \times \Delta PSD$ of the mixed high-nickel positive electrode material was relatively low, indicating that the particle size distribution of the material was relatively concentrated. However, a crystal particle size of the formed material was excessively small with a greater quantity of internal interfaces, and therefore the gassing problem of the battery was not mitigated.

It can be seen from Examples 8 and 14 that, when the degree of crystallinity and particle size distribution of the mixed high-nickel active material were controlled, the pressure-resistant strength of the secondary particles and monocrystalline particles that form the material was optimized, to further improve the pressure-resistant strength of the positive electrode material, improve gassing and safety of the high capacity battery, and improve the volume energy density of the lithium-ion battery.

The foregoing descriptions are merely preferred embodiments of this application and are not intended to limit this application in any form or essence. It should be noted that those of ordinary skill in the art may also make some improvements and supplements to the methods of this application, and such improvements and supplements shall also be considered as the protection scope of this application. Some equivalent changes of alternations, modifications, and evolution made by using the technical content disclosed above by those skilled in the art without departing from the spirit and scope of this application are equivalent embodiments of this application. In addition, any equivalent changes of alternations, modifications, and evolution on the foregoing embodiments made in accordance with substantive techniques of this application still fall within the scope of the technical solutions of this application.

What is claimed is:

1. A positive electrode material, wherein the positive electrode material includes a lithium-nickel transition metal oxide A and a lithium-nickel transition metal oxide B, the lithium-nickel transition metal oxide A is secondary particles, and a chemical formula of the lithium-nickel transition metal oxide A is shown in Formula I:

$$Li_{a1}(Ni_{b1}Co_{c1}Mn_{d1})_{x1}M_{1-x1}O_{2-e1}X_{e1} \qquad (I)$$

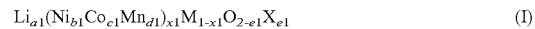

in Formula I, $0.95 \leq a1 \leq 1.05$, $0.7 \leq b1 \leq 0.98$, $0.01 \leq c1 \leq 0.15$, $0.01 \leq d1 \leq 0.3$, $0.95 \leq x1 \leq 1$, and $0 \leq e1 \leq 0.1$, wherein M is selected from any one or a combination of Al, Ti, Zr, Nb, Sr, Sc, Sb, Y, Ba, B, C, Co, and Mn, and X is selected from F and/or Cl;

the lithium-nickel transition metal oxide B is monocrystalline or monocrystalline-like particles, and a chemical formula of the lithium-nickel transition metal oxide B is shown in Formula II:

$$Li_{a2}(Ni_{b2}Co_{c2}Mn_{d2})_{x2}M'_{1-x2}O_{2-e2}X'_{e2} \qquad (II)$$

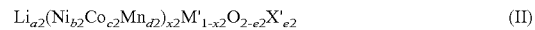

In Formula II, $0.95 \leq a2 \leq 1.05$, $0.7 \leq b2 \leq 0.98$, $0.01 \leq c2 \leq 0.15$, $0.01 \leq d2 \leq 0.3$, $0.95 \leq x2 \leq 1$, and $0 \leq e2 \leq 0.1$, where M' is selected from any one or a combination of Al, Ti, Zr, Nb, Sr, Sc, Sb, Y, Ba, B, C, Co, and Mn, and X' is selected from F and/or Cl; and a crystal size $D_{104}$ of the positive electrode material and a particle size distribution change rate $\Delta PSD$ of the positive electrode material satisfy:

$$50 \text{ nm} \leq D_{104} \times \Delta PSD \leq 450 \text{ nm, wherein}$$

$\Delta PSD$ is a particle size distribution change rate calculated according to the formula $\Delta PSD=(D_v90-D_v10)/D_v50$ based on a measured particle size of volume particle distribution of the positive electrode material, and $D_{104}$ is a crystal size obtained by fitting a peak value of a 104 crystal plane through XRD ray diffraction testing on the positive electrode material.

2. The positive electrode material according to claim 1, wherein the positive electrode material satisfies: $80 \text{ nm} \leq D_{104} \times \Delta PSD \leq 250 \text{ nm}$.

3. The positive electrode material according to claim 1, wherein $\Delta PSD$ is within a range of 1.2 to 3.1.

4. The positive electrode material according to claim 1, wherein $\Delta PSD$ is within a range of 1.5 to 2.2.

5. The positive electrode material according to claim 1, wherein the lithium-nickel transition metal oxide A has a single-particle pressure-resistant strength of $\geq 100$ MPa, and the lithium-nickel transition metal oxide B has a single-particle pressure-resistant strength of $\geq 50$ MPa.

6. The positive electrode material according to claim 1, wherein the lithium-nickel transition metal oxide A has $D_v50$ of 8 μm to 15 μm, $D_v10$ of 3 μm to 8 μm, and $D_v90$ of 15 μm to 25 μm.

7. The positive electrode material according to claim 1, wherein the lithium-nickel transition metal oxide A comprises secondary particles composed of primary particles, and the primary particles have a particle size of 30 nm to 800 nm.

8. The positive electrode material according to claim 1, wherein the lithium-nickel transition metal oxide A comprises secondary particles composed of primary particles, and the primary particles have a particle size of 200 nm to 500 nm.

9. The positive electrode material according to claim 1, wherein the lithium-nickel transition metal oxide B has $D_v50$ of 1 μm to 7 μm, $D_v10$ of 1 μm to 3 μm, and $D_v90$ of 5 μm to 10 μm.

10. The positive electrode material according to claim 1, wherein the lithium-nickel transition metal oxide B has $D_v50$ of 3 μm to 5 μm, $D_v10$ of 1 μm to 3 μm, and $D_v90$ of 5 μm to 10 μm.

11. The positive electrode material according to claim 1, wherein a mass ratio of the lithium-nickel transition metal oxide A to the lithium-nickel transition metal oxide B is 10:1 to 1:1.

12. The positive electrode material according to claim 1, wherein a mass ratio of the lithium-nickel transition metal oxide A to the lithium-nickel transition metal oxide B is 4:1 to 2:1.

13. The positive electrode material according to claim 1, wherein a specific surface area of the positive electrode material is 0.5 $m^2/g$ to 1.5 $m^2/g$.

14. The positive electrode material according to claim 1, wherein a specific surface area of the positive electrode material is 0.6 $m^2/g$ to 1.0 $m^2/g$.

15. The positive electrode material according to claim 1, wherein the positive electrode material has a compacted density of 3.3 $g/cm^3$ to 3.7 $g/cm^3$.

16. The positive electrode material according to claim 1, wherein the lithium-nickel transition metal oxide A and/or the lithium-nickel transition metal oxide B are surface-modified, the surface modification method comprising one or a combination of doping the particle surface, oxide coating the particle surface, and carbon coating the particle surface, wherein doping and coating elements are selected from one or a combination of Mg, Al, Ti, Co, Fe, Cd, Zr, Mo, Zn, B, P, Cu, V, and Ag.

17. An electrochemical energy storage apparatus, comprising the positive electrode material according to claim 1.

* * * * *